US008353705B2

(12) United States Patent
Dobson et al.

(10) Patent No.: US 8,353,705 B2
(45) Date of Patent: Jan. 15, 2013

(54) ATTENDANCE TRACKING SYSTEM

(75) Inventors: Michael Dobson, Sutter, CA (US);
Douglas Ahlers, Yuba City, CA (US);
Bernie DiDario, Sutter, CA (US)

(73) Assignee: InCom Corporation, Sutter, CA (US)

( * ) Notice: Subject to any disclaimer, the term of this patent is extended or adjusted under 35 U.S.C. 154(b) by 1024 days.

(21) Appl. No.: 10/919,723

(22) Filed: Aug. 16, 2004

(65) Prior Publication Data
US 2006/0035205 A1 Feb. 16, 2006

(51) Int. Cl.
G09B 9/00 (2006.01)
G08B 29/00 (2006.01)

(52) U.S. Cl. ....... 434/155; 340/5.81; 340/5.5; 340/10.1; 434/109; 434/307 R

(58) Field of Classification Search .............. 434/322, 434/323, 350, 351, 362, 365, 109, 155, 307 R, 434/308, 319; 340/5.53, 10.1, 568.1, 5.5, 340/5.81; 705/7, 10
See application file for complete search history.

(56) References Cited

U.S. PATENT DOCUMENTS

| 3,740,725 | A |   | 6/1973  | Fletcher et al. |
| 5,218,344 | A | * | 6/1993  | Ricketts ................ 340/573.4 |
| 5,515,419 | A | * | 5/1996  | Sheffer ................. 455/456.5 |
| 5,870,029 | A | * | 2/1999  | Otto et al. ............ 340/825.36 |
| 5,956,696 | A |   | 9/1999  | Guryel |
| 6,173,153 | B1 |  | 1/2001  | Bittman |
| 6,346,886 | B1 | * | 2/2002  | De La Huerga ........ 340/573.1 |
| 6,411,796 | B1 | * | 6/2002  | Remschel ................ 434/350 |
| 6,633,223 | B1 | * | 10/2003 | Schenker et al. .......... 340/5.53 |
| 6,663,223 | B2 |  | 12/2003 | Horii et al. |
| 6,992,566 | B2 | * | 1/2006  | Striemer ................. 340/10.1 |
| 7,034,683 | B2 | * | 4/2006  | Ghazarian ............... 340/568.1 |
| 7,092,669 | B2 | * | 8/2006  | Sakai et al. ............... 434/350 |
| 7,327,251 | B2 | * | 2/2008  | Corbett, Jr. ............ 340/539.13 |
| 2002/0002477 | A1 | * | 1/2002  | Fox et al. ................... 705/7 |
| 2002/0030582 | A1 | * | 3/2002  | Depp et al. ................ 340/5.53 |
| 2002/0082897 | A1 | * | 6/2002  | Menelly et al. ............. 705/10 |
| 2002/0178038 | A1 | * | 11/2002 | Grybas ....................... 705/7 |
| 2002/0192631 | A1 | * | 12/2002 | Weir et al. .................. 434/350 |

(Continued)

FOREIGN PATENT DOCUMENTS

EP 1 071 046 1/2001

(Continued)

OTHER PUBLICATIONS

Jo Best, Schoolchildren to be RFID-chipped, Japanese authorities decide tracking is best way to protect kids, Jul. 8, 2004.*

Primary Examiner — Kang Hu
(74) Attorney, Agent, or Firm — Heisler & Associates

(57) ABSTRACT

An automated attendance monitoring system is disclosed. The system includes (i) identification tags, with wireless communication capabilities, for each potential attendee, (ii) scanners for detecting the attendees' tags as they enter a given room, (iii) at least one server in communication with the scanners, (iv) handheld computing devices for use by attendance trackers, such as teachers, to verify a provisional attendance report generated by the scanners and server, and (v) software running on the server for receiving and managing the attendance data received from the scanners, and for generating attendance reports. Although particularly well-suited for tracking attendance in schools, the present invention can also be used in a variety of other settings where there is a need to track the whereabouts of a number of individuals.

9 Claims, 12 Drawing Sheets

U.S. PATENT DOCUMENTS

| | | |
|---|---|---|
| 2003/0001722 A1 | 1/2003 | Smith |
| 2003/0167193 A1* | 9/2003 | Jones et al. .................. 705/7 |
| 2003/0197607 A1 | 10/2003 | Striemer |
| 2004/0066276 A1 | 4/2004 | Gile |
| 2005/0244803 A1* | 11/2005 | Brown et al. ................ 434/350 |

FOREIGN PATENT DOCUMENTS

| | | |
|---|---|---|
| JP | 07160771 A | 6/1995 |
| JP | 2003141268 A1 | 5/2003 |
| WO | WO 94/08410 | 4/1994 |

* cited by examiner

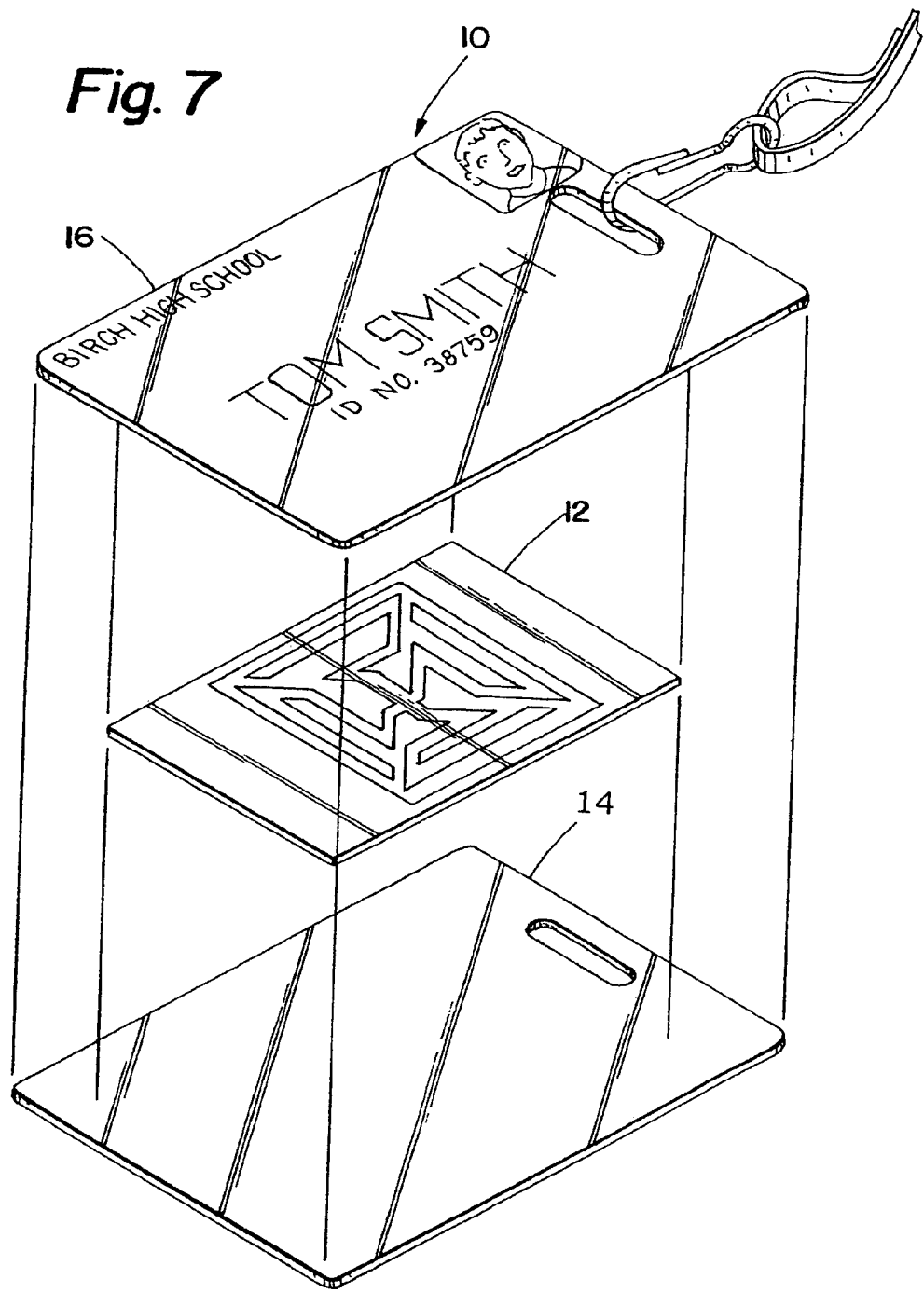

SUTTER COUNTY SUPERINTENDENT OF SCHOOLS
MONTHLY ATTENDANCE REPORT - ELEMENTARY

REPORT DUE NO LATER THAN ONE WEEK AFTER CLOSE OF SCHOOL MONTH

| NAME OF DISTRICT | SCHOOL MONTH # | DATE BEGAN |
|---|---|---|
| NAME OF SCHOOL | DAYS TAUGHT | DATE ENDED |

|  | 1<br>Total Students Enrolled | 2<br>Total Apportionment Days Col. 1 x # Days Taught | 3<br>Less: Days Not Enrolled | 4<br>Less: Days Absent | 5<br>Days of Apportionment Attendance Col 2-3&4 | 6<br>Total ADA Col. 5 / # Days Taught |
|---|---|---|---|---|---|---|
| Kindergarten |  |  |  |  |  |  |
| Grades 1-3 |  |  |  |  |  |  |
| Grades 4-6 |  |  |  |  |  |  |
| Grades 7-8 |  |  |  |  |  |  |
| Opportunity Schools |  |  |  |  |  |  |
| Home & Hospital |  |  |  |  |  |  |
| Special Education |  |  |  |  |  |  |
| Sp Ed - Non-Public |  |  |  |  |  |  |
| Sp Ed - Extended Yr. |  |  |  |  |  |  |
| Extended Yr. Non-Public |  |  |  |  |  |  |
| Sub-Total ADA |  |  |  |  |  |  |
| Other ADA: |  |  |  |  |  |  |
|  |  |  |  |  |  |  |
|  |  |  |  |  |  |  |
| TOTAL ADA |  |  |  |  |  |  |
| Long-Term Independent Study |  |  |  |  |  |  |
| (included in above ADA) |  |  |  |  |  |  |
| Make Up Saturday School |  |  |  |  |  |  |
| (included in above ADA) |  |  |  |  |  |  |

| Supplemental Hours |  | Total Hours |
|---|---|---|
| K-12 Core | C-1 |  |
| 7-12 Remedial | C-2 |  |
| 2-9 Retained | C-3 |  |
| 2-6 At Risk * | C-4 |  |
| 2-6 At Risk ** | C-5 |  |
| 2-6 Low Star | C-6 |  |
| 2-6 Low Star | C-7 |  |
| K-4 Int. Reading | C-8 |  |
| 7-8 Int. Algebra | C-9 |  |
| Total Hours |  |  | prior to 1/1/03
1/1/03-6/30/03

Prepared by             Dat

Approved by             Dat

Revised                 Dat

Fig. 9a

Fiscal Year 2002-2003 Certified Annual Report

Student Attendance
for the 2002-2003 School Year

CEDAR RAPIDS ▶

1053

F1

| | | 1 | 2 |
|---|---|---|---|
| 1 | Student Contact Days, Regular Session | 180 | |
| 2 | Student Contact Days, Summer Session | 30 | |

| | | Enrolled Student Cumulative Count | | Aggregate Days | | Average Daily Attendance (ADA) | Average Daily Membership (ADM) |
|---|---|---|---|---|---|---|---|
| | Grade | Nonpublic Shared-Time | Public Resident and Nonresident | Present | Absent | | |
| | Regular Session Attendance | 1 | 2 | 3 | 4 | 5 | 6 |
| 3 | Special Education Pre-Kindergarten, other than Self-Contained | - | 109 | 13,185 | 1,399 | | |
| 4 | Kindergarten | - | 1,535 | 220,839 | 12,450 | | |
| 5 | First | - | 1,370 | 203,840 | 10,192 | | |
| 6 | Second | - | 1,409 | 219,603 | 9,772 | | |
| 7 | Third | - | 1,461 | 224,921 | 9,950 | | |
| 8 | Fourth | - | 1,521 | 232,620 | 10,273 | | |
| 9 | Fifth | - | 1,467 | 227,596 | 11,060 | | |
| 10 | Sixth | - | 1,525 | 241,006 | 11,106 | | |
| 11 | Seventh | - | 1,552 | 242,690 | 12,336 | | |
| 12 | Eighth | - | 1,518 | 244,229 | 11,772 | | |
| 13 | Ninth | - | 1,656 | 235,626 | 13,402 | | |
| 14 | Tenth | - | 1,640 | 222,235 | 15,142 | | |
| 15 | Eleventh | 1 | 1,718 | 225,298 | 18,420 | | |
| 16 | Twelfth | 16 | 1,411 | 195,051 | 13,575 | | |
| 17 | Special Education Self-Contained Pre-Kindergarten | - | - | - | - | | |
| 18 | Special Education, Self-Contained (2.35 and 3.74) | - | - | - | - | | |
| 19 | TOTAL | 17 | 19,892 | 2,948,739 | 160,849 | 16,382 | 17,275 |

| | | | | | | | |
|---|---|---|---|---|---|---|---|
| 20 | Summer Session, All Grades | - | 905 | 17,956 | - | | |

Fig. 9b

Report of Attendance for Pupils Residing in the District

County: Sutter  
District: Brittan Elementary  
CDS CODE   51   71357  
Fiscal Year: 2003-04  
P-2

| Regular Elementary and High School ADA | | Elementary | High School |
|---|---|---|---|
| Kindergarten | A-1 | | ███████████ |
| Grades 1 - 3 | A-2 | | ███████████ |
| Grades 4 - 6 | A-3 | | ███████████ |
| Grades 7 - 8 | A-4 | | ███████████ |
| Grades 9 - 12 | A-5 | ███████ | |
| Continuation Education | A-6 | ███████ | |
| Opportunity Schools and Full-Day Opportunity Classes | A-7 | | |
| Home and Hospital | A-8 | | |
| Special Education - Special Day Class | A-9 | | |
| Special Ed - Nonpublic, Nonsectarian Schools [E.C. 56366(a)(7)] | A-10 | | |
| Special Ed - Nonpublic, Nonsectarian Schools [E.C. 56836.16] | A-11 | | |
| Community Day School (Divisor 70/135/180) | A-12 | | |
| Extended Year ADA (Divisor 175) | | | |
| Extended Year Special Education - Special Day Class | A-13 | | |
| Extended Year Prog - Nonpublic, Nonsectarian Schools [E.C. 56366(a)(7)] | A-14 | | |
| Extended Year Prog - Nonpublic, Nonsectarian Schools [E.C. 56836.16] | A-15 | | |
| Regional Occupational Centers/Progs ADA (Divisor 85/135/175) | B-1 | ███████████ | |
| Classes for Adults ADA (Divisor 85/135/175) | | | |
| Concurrently Enrolled Secondary Students | B-2 | ████████ | |
| Adults Enrolled, State Apportioned | B-3 | ██████ | |
| Students 21 Years or Older and Students 19 or Older Not continuously Enrolled Since Their 18th Birthday, Participating in Full-Time Independent Study | B-4 | ██████ | |
| Adults in Correctional Facilities ADA | B-5 | ████████ | |
| ADA Totals (Sum of A-1 through B-5) | B-6 | | |
| Supplemental Instructional Hours - Summer School / Before School/ After School/Saturday/Intersession | | | |
| Grades K - 12 Core Instruction | C-1 | | |
| Grades 7 - 12 Remedial Instruction | C-2 | | |

California Department of Education  
Attendance Software  
2003-3.06   Page 1 of 2   11/1/2004 11:31:54 AM

Fig. 9c

ATTENDANCE TRACKING SYSTEM

BACKGROUND OF THE INVENTION

1. Field of the Invention

This invention relates to systems and methods for tracking the location of individuals, such as students entering or leaving a classroom.

2. General Background

For many educational and other institutions, tracking attendance can be a time-consuming and tedious chore. Typically, a teacher takes attendance manually, by asking each student to state "here" when his or her name is called, or by scanning the classroom to determine which students are present. The teacher then writes the information down, and it is transmitted to the school administration, often by hand. If a student enters the class late, after attendance has been taken, the teacher must take note of that fact, and interrupt teaching to update his or her attendance records.

This traditional method of tracking attendance suffers from a number of drawbacks. The process is tedious, time-consuming, and subject to human error. Like all paper-based recordkeeping systems, the system is vulnerable to lost or misfiled data.

The consequences of poor attendance recordkeeping can be significant for schools, administrators, and school districts. Throughout the country, average daily attendance (ADA) is a critical statistic that is used to determine school funding. Since school funding is based on ADA figures, schools lose money every time a student is absent. And when poor or inconsistent attendance tracking wrongly indicates that a present student is absent, the school needlessly loses funding.

Additionally, traditional attendance tracking methods make it difficult to prepare the attendance reports required by governmental agencies. Various agencies require ADA and other data to be reported in particular formats, but the traditional methods of tracking attendance do not provide an easy way to prepare these reports.

At least one automated attendance monitoring system has already been developed, and this system uses student-specific identity tags or cards and wireless readers to track the physical location of students. See U.S. patent application No. 2003/0197607. But this system does not provide any verification means for ensuring the integrity of the attendance data. Errors could arise for a number of reasons, such as if a student forgets his or her card, or if students trick the previous system by swapping tags or carrying tags for absent friends. Also, the previous system could not generate reports or export data in the various formats required by the school administration and governmental agencies, nor did it provide any ability for teachers to generate instant attendance reports.

Therefore, there is a need for an automated attendance monitoring system that not only counts and identifies tags or cards as they enter or leave a classroom, but that also has robust means for ensuring the integrity of the attendance data, and that has the ability to prepare customized attendance reports for use by governmental agencies and others.

SUMMARY OF THE INVENTION

The present invention is an automated attendance monitoring system, comprising: (i) student-specific identification tags with wireless communication capabilities (ii) scanners for detecting the tags as they enter a particular area, (iii) handheld computing devices for use by teachers in verifying the automated attendance count, (iv) at least one server in communication with the scanners, and (v) software running on the server for receiving and managing the attendance data received from the scanners. With the present system, school administrators are able to keep accurate attendance records, to track the location of students as they move about the school campus, and to easily prepare reports for use by various governmental agencies.

An overview of the system is provided in FIG. 3. At step 100, the students first enter the classroom, and then at step 100 a scanner reads their tags. At 120 data is transmitted from the scanner to a server, and at 130 the server generates a provisional attendance report. At 140 the provisional attendance report is sent to the teacher's handheld computing device. At 150, the teacher visually inspects the classroom to verify the provisional attendance report. If there are no changes (step 160) the data is finalized, and if changes are necessary they are made by the teacher at step 170, and then the data is finalized at step 180.

BRIEF DESCRIPTION OF THE DRAWINGS

FIG. 7 is an exploded perspective view of a tag according to an embodiment of the present invention, as integrated with a student ID card and covered with lamination.

FIGS. 9a-9c show sample ADA reporting formats for various jurisdictions.

DETAILED DESCRIPTION

Figure 1:
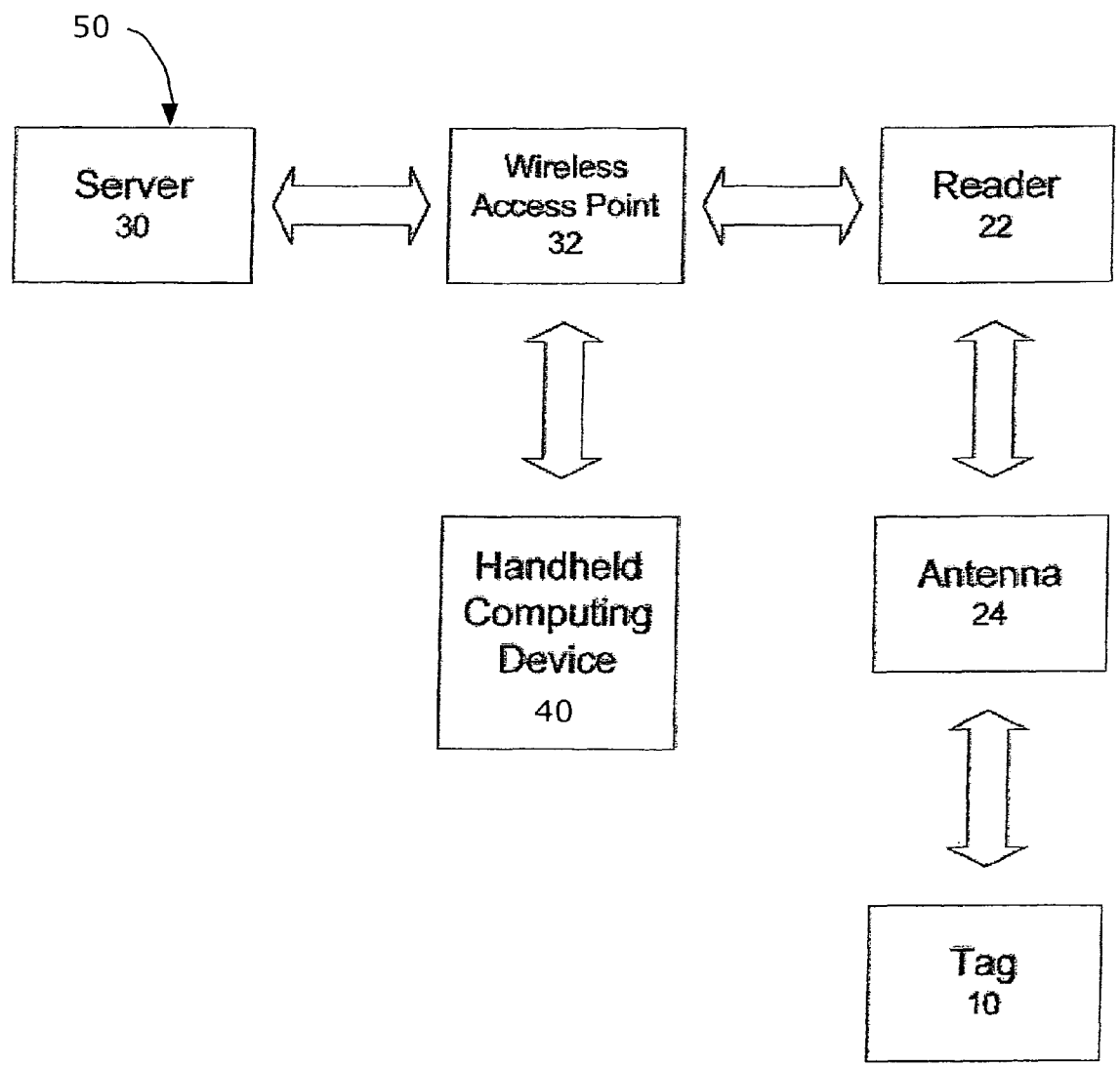
FIG. 1 is a block diagram of a single-scanner embodiment of the present invention.
Figure 2:
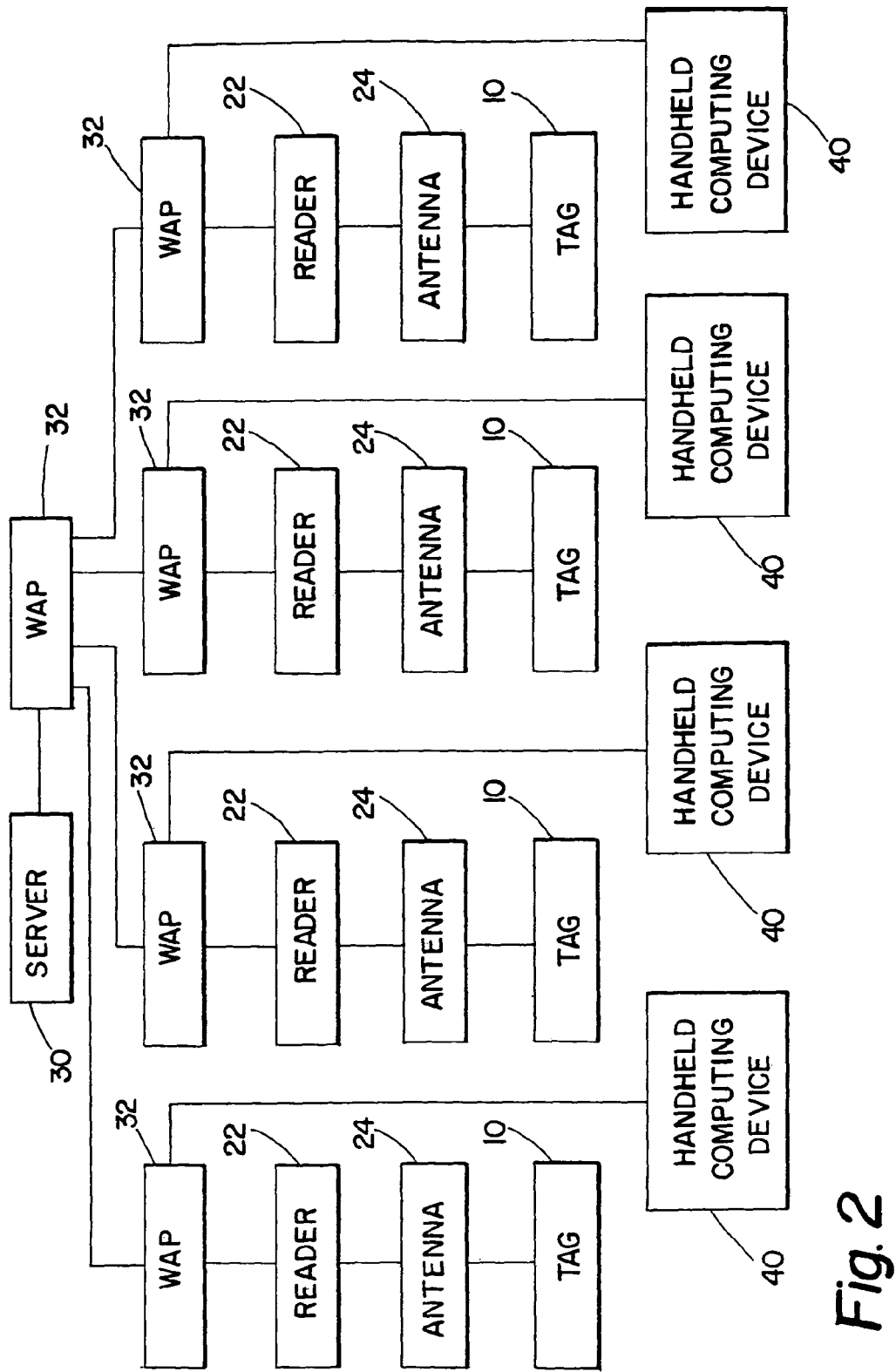
FIG. 2 is a block diagram of a more complex embodiment of the present invention, with multiple scan locations.
Figure 3:
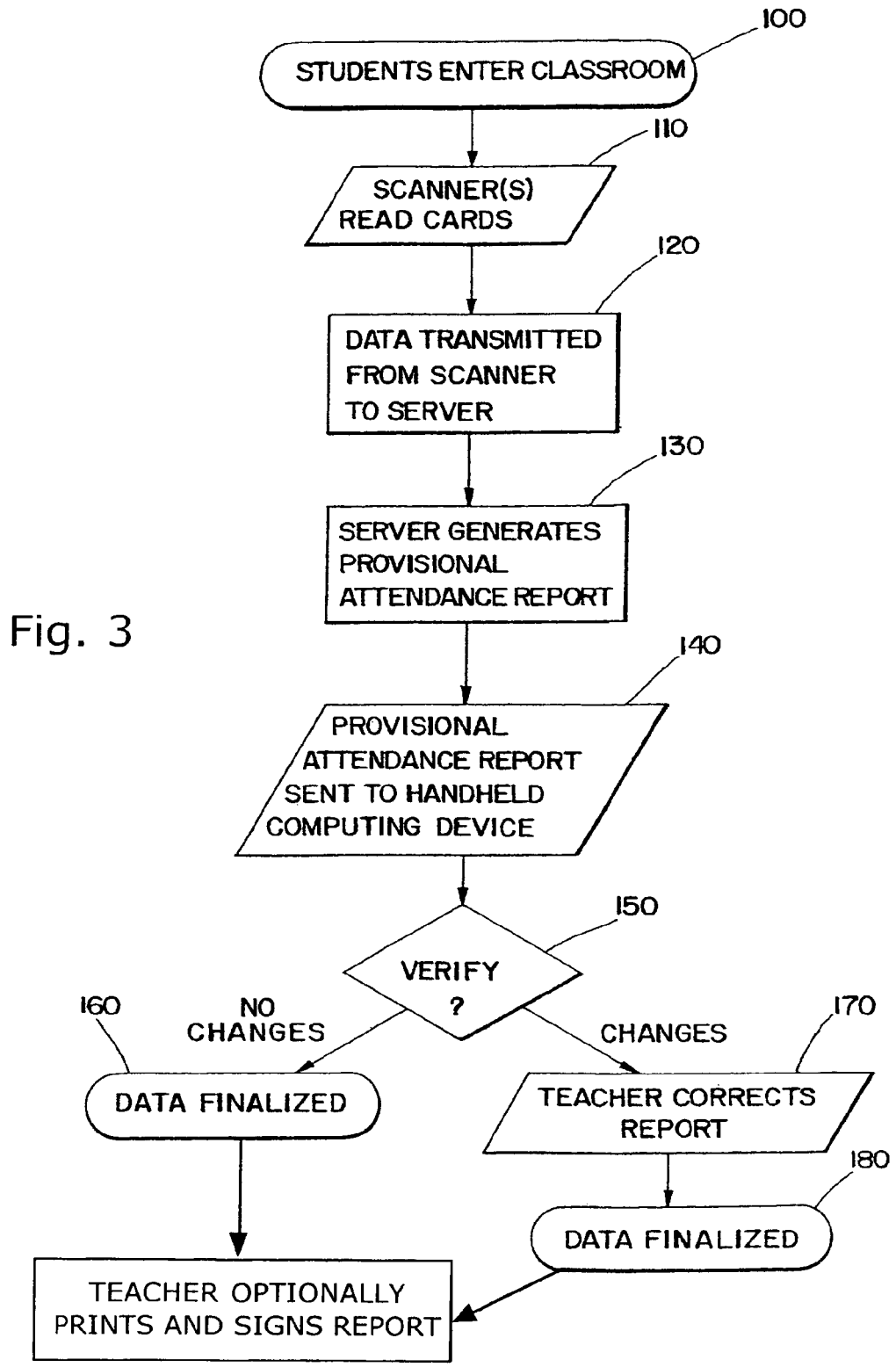
FIG. 3 is a flowchart of the major steps of a method according to an embodiment of the present invention.

The present invention is an automated attendance monitoring system, comprising: (i) student-specific identification tags with wireless communication capabilities (ii) scanners for detecting the tags as they enter a given room, (iii) at least one server in communication with the scanners, (iv) handheld computing devices for use by teachers in verifying the provisional attendance report generated by the scanners and server, and (v) software running on the server for receiving and managing the attendance data received from the scanners.

Tags

The identification tags 10 serve to identify each student. See FIGS. 1, 2, 3, 7. In one embodiment, the tags are Radio Frequency Identification (RFID) tags, such as those manufactured and sold by Matrics, Inc. of Rockville, Md. In this embodiment, each tag 10 is comprised of an RFID chip 12, which is in read/write format, and which contains an encrypted student identifier. In one embodiment, the encryption on the tag 10 functions by ensuring that the identification number on the chip 12 is useless unless matched with the software on the server. See FIG. 7. Each tag 10 also includes a tag antenna 14 that attaches to the chip and surrounds it in a fan-like configuration, encompassing the entire perimeter of the tag itself. See FIG. 7. The tags 10 can be of various sizes, and in one embodiment they may be approximately 2 inches by 2 inches. In this embodiment, the tags 10 are passive, which means that they emit a signal only in response to activation by the scanners 20.

The tags 10 contain student-specific encrypted identification data, so that when the scanners 20 read the tags, the system can identify the student. In one embodiment, the student-specific encrypted identification data comprises an encrypted student identification number. The encrypted data does not provide usable information to other scanners, so that compatible scanners in department stores or other locations cannot read the student's information. This helps protect the students' privacy.

In one embodiment, the tags 10 are integrated with a standard student ID card 16 (with photograph and student number) to form a single unit, and then both the tag and ID card may be laminated for protection, or they may be enclosed in a hard plastic case. See FIG. 7. In this embodiment, the integrated unit serves two purposes: to provide encrypted identification information to the server 30 via the reader 22, and to operate as a standard student ID card. However, the encrypted identification information on the tags 10 will typically not be the same as the student ID number, but instead will correspond to a student ID number, and the software 50 will be able to identify the student based on the encrypted information. The tags will typically be read-only.

The students may place their tags 10 in their pockets or backpacks, but preferably the students will use a lanyard to wear the tags 10 around their necks, to maximize the ability of the scanners 20 (which include the reader 22 and the antenna 24) to read the tags 10.

Scanners

Figure 8A:
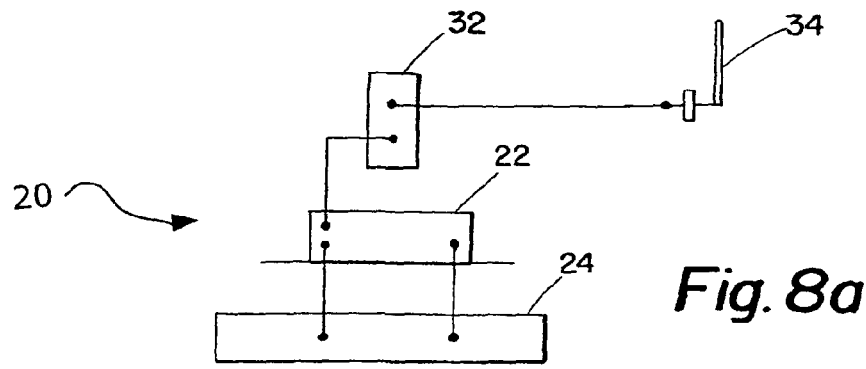
FIG. 8 is a perspective view of a scanning system according to an embodiment of the present invention, as installed in doorway.
Figure 8B:
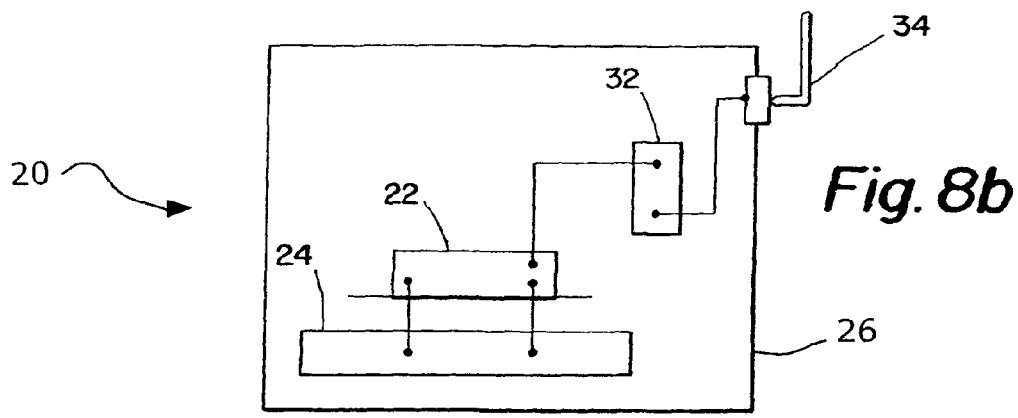
Figure 8C:
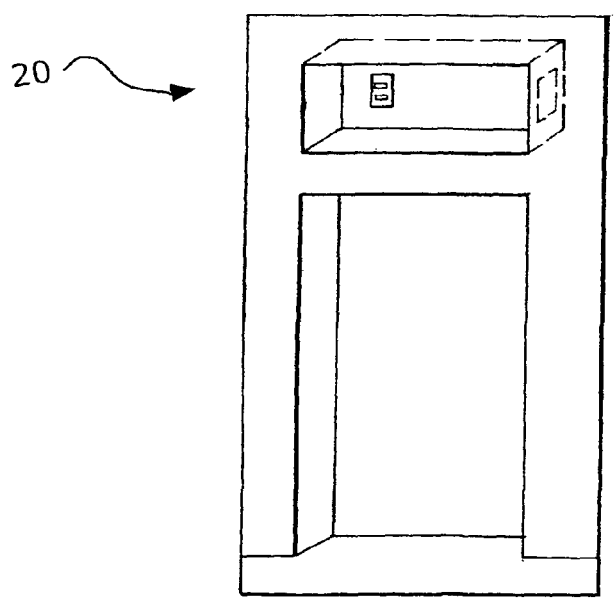

The scanners 20 detect the tags 10 as the students enter the classroom. See FIGS. 1, 3, and 8. Typically, the scanners 20 would be permanently mounted near the entrance of the room, such as above or on the sides of the doorway. See FIG. 8. Since a number of students may simultaneously enter the room, the scanner should have the ability to read many tags 10 during a short period of time, and in one embodiment, the scanner can read up to 200 tags per second.

When RFID tags are used, the scanners 20 will likewise be RFID scanners. Thus, in one embodiment the scanners can be the Matrics AR 400 wireless scanner. This particular scanner has dimensions of 8.75 inches by 11.75 inches, and a depth of 2 inches. It weighs 6 pounds and has three LEDs for visual status verifications. The power supply is 24-volt DC with 1.2 amps. The Matrics AR 400 also includes a network device called a Matrics Visibility Manager (MVM), which is a software based computer system that allows communication between the reader 22 and the encrypted identification data in the tags 10 for each student. The MVM also manages the readers and connects them to each other. It is a Linux based system with proprietary Matrics software that controls and links a server to the RFID Reader 22. The MVM would typically be housed within the vicinity of the server 30, but also could be placed in other locations, such as in proximity to the scanners 20. Of course, many other scanners could be used, and the system may also use other software programs to integrate the functions of the MVM into the server.

The scanner 20 consists of a reader 22 and a separate antenna 24. See FIGS. 1 and 3. The scanner 20 typically will be housed within an enclosure 26. See FIG. 8b. The function of the reader 22 is to detect the tags 10 as they pass the scanner 20. The reader 22 also transmits the data to the server 30. If the reader 22 does not have wireless communication means, then it may transmit the data to the server 30 though the wireless access points 32. The scanner 20 is mounted with standard hardware to the sides or above each door. See FIG. 8.

The function of the antenna 24 is to activate the tags. In one embodiment, the antenna 24 activates the tags so long as they are within 25 feet of antenna 24. Like the reader, the antenna 24 may be mounted atop the doorway or along the sides of the doorway. See FIG. 8. The antenna 24 activates the passive tags 10 as they pass by the scanner 20, and the signal from the activated tags 10 is then received by the antenna 24 and the reader 22, and the reader 22 then sends the information to the server 30 for processing.

Server

The raw attendance data is sent in real time from the scanners 20 to the server 30, and the server 30 processes this data to create the desired attendance records. See FIGS. 1 and 3. In one embodiment, the server consists of a microprocessor which contains an Intel® Pentium 4 processor, with one Gigabyte of RAM, SCSI Hard Drive, CD-ROM, Wireless Network Card with a small wireless antenna, standard Network Interface Card, Video Card, keyboard, Mouse, Microsoft Windows® 2000 Professional, 17" Flat Panel LCD Display, 3.5" Floppy Disk Drive, Standard USB Parallel and COM Ports. The server 30 may be connected to a standard black and white laser printer.

Of course, many other server configurations could be used, and the technical description of the server 30 provided above is for illustration only. There are numerous models and brands of server, internal microprocessor configurations, operating systems and peripherals that will be available for use in the system described herein. For purposes of the patent, "server" shall generically refer to any suitable computing device.

The server 30 will be able to access student identification information, class schedules, and other data so that it can track attendance in each class. It will also be able to track attendance in groups of classes, such as all freshmen classes, or all classes at the school. The server 30 will also be able to track and report attendance by any unit of time, such as by class period or by day. As explained below, specially-created software 50 is used to enable the server to perform these functions.

Handheld Computing Devices

Figure 4:
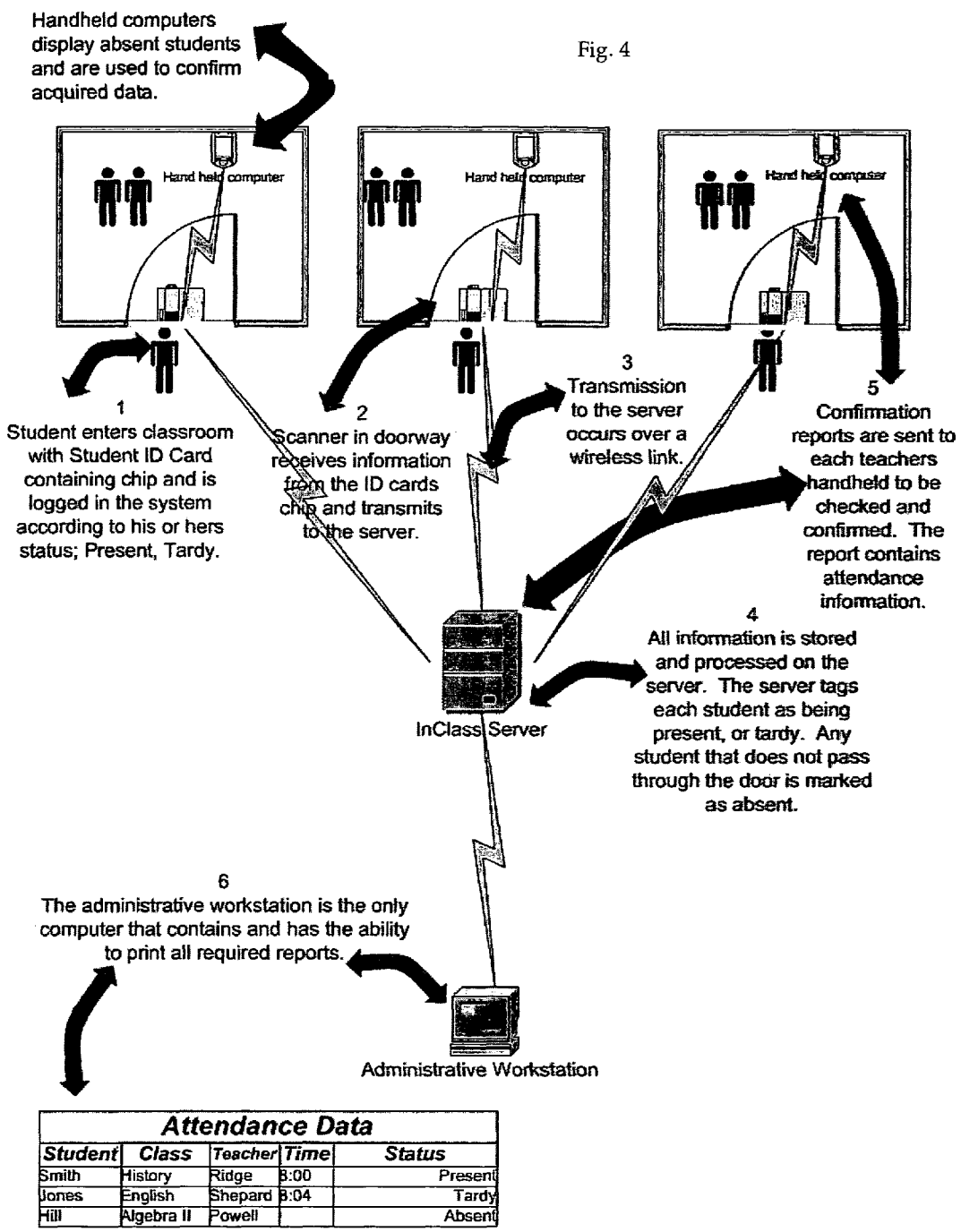
FIG. 4 provides as graphical and textual overview of one embodiment of the present invention.

Handheld computing devices 40 are used by teachers or other attendance trackers to verify the provisional attendance report that is automatically generated by the system. See FIG. 5. Within minutes or even seconds after the class period has begun, the teacher's handheld computing device will receive the provisional attendance report from the server 30, indicating which students are present and which are absent. See FIGS. 4 and 5. The teacher then visually inspects the classroom to determine if the report is accurate and complete.

Figure 5:
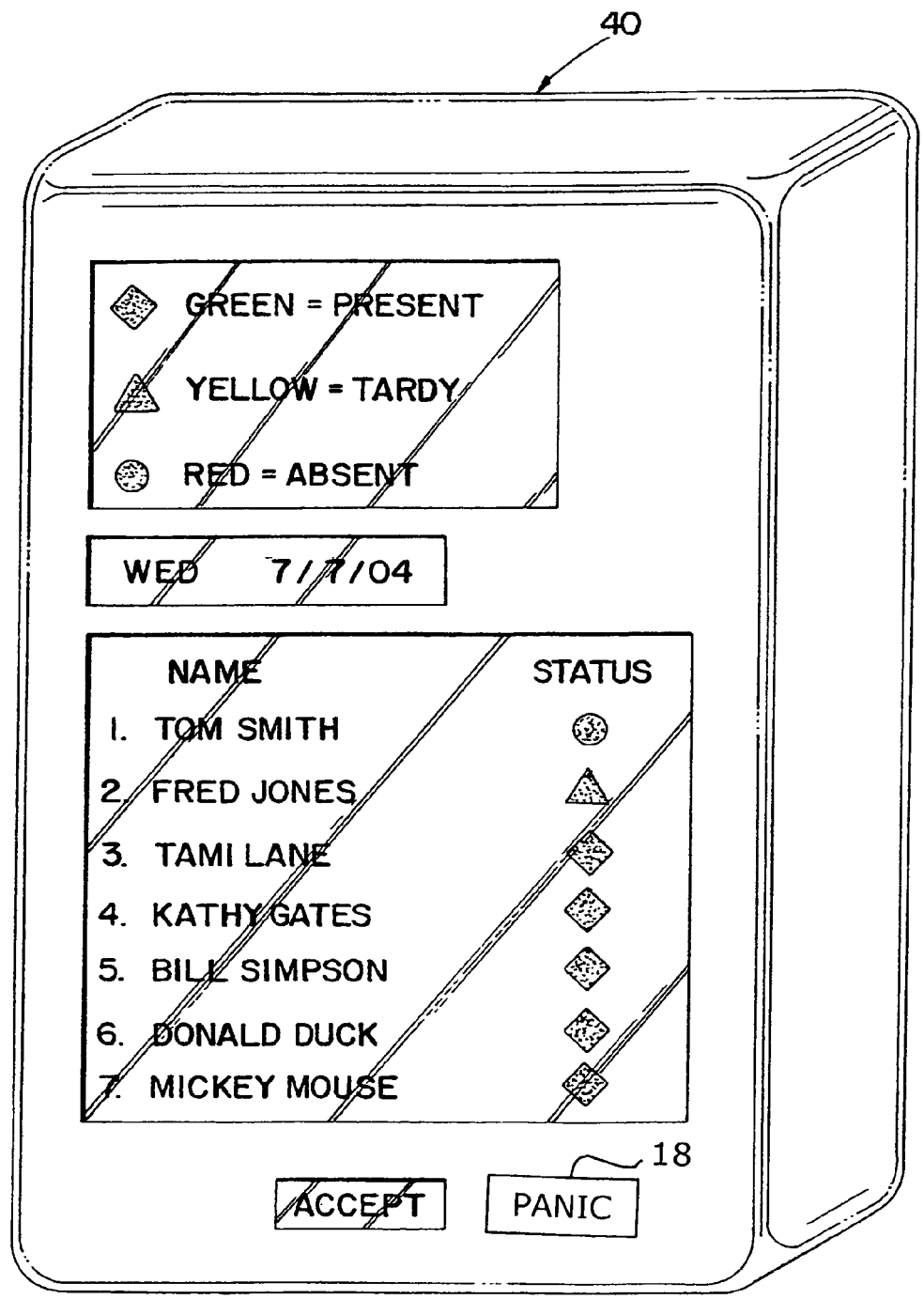
FIG. 5 shows a provisional attendance report that would be displayed on a handheld computing device according to an embodiment of the present invention.

As shown in FIG. 5, in one embodiment the provisional attendance report may indicate a list of the students' name, and a status symbol by each name indicating whether that student is present, tardy, or absent. The provisional report may include a seating chart and attendance list for each class or other attendance period. The chart will show each student in that class, with color coding for status: green for present, red for absent, and yellow for tardy. The provisional attendance report can also use symbols (triangles, squares, circles, etc.) in lieu of or in conjunction with a color-coded status symbol.

If the provisional report is accurate and complete, the teacher approves it by pressing an "accept" button. See FIG. 5. If it is inaccurate or incomplete, the teacher can correct the provisional report, by changing the attendance status (present, absent, tardy) for any student whose status has been incorrectly recorded. See FIG. 5. For instance, if student "Tom Smith" in FIG. 5 is actually present but he forgot his tag and so is provisionally marked as "absent," the teacher could change Smith's status by touching the red circle to the right of Smith's name with a stylus, and then press the green diamond on the top of the screen to indicate that Smith's status should be changed to "present." Once all the necessary changes have been made, the teacher would press the "accept" key.

The attendance tracker can also correct the seating assignment as reflected on the provisional attendance report, if the actual seat assignment for any student has changed.

When the report has been accepted, the teacher may then print a copy of this final attendance report for signature, using an in-class printer that is in wireless communication with the handheld computing device. School districts typically require a teacher's signature on attendance records, so in most cases the teacher will print a hard copy of the report, and then sign it before sending it to the school administration.

The system's ability to allow the teacher to verify attendance by visual inspection is very important, because without it students can trick the system by carrying their friends' tags 10. But by giving each teacher his or her own handheld computing device 40, and by feeding real-time attendance data to that device, the present system has a robust method of ensuring that the attendance records are accurate.

The scanners 20 continue to monitor attendance during the entire class period, and thus the attendance records will also include data concerning students who were present but tardy, and students who left early. Students entering the classroom after a designated time period will be labeled by the server 30 and software 50 as tardy for that class period. The server 30 then transmits a "tardy slip" to the handheld computing device 40 for acceptance or rejection by the teacher. If the teacher wishes to accept the tardy designation for a particular student, the teacher so indicates on the handheld computing device 40. If the teacher wishes to reject the tardy designation, because the student has a valid excuse for his or her late arrival, the teacher can "reject" the tardy slip using the handheld computing device 40, and also can provide an explanation as to why the tardy designation was rejected. This system minimizes the amount of time necessary to report and document tardy behavior.

The system also monitors students entering and leaving the classroom whom have already been marked as present during a class period. This monitoring will allow the school to correlate time away from class with school security problems, such as vandalism. This will also allow the school to track minutes in class, which must be tracked for certain special programs.

The handheld computing device 40 may also function as a security system for the teacher and the classroom. The teacher will have the ability to summon assistance by using a panic button on the device's screen. This button, when activated, will alert the administration of the need for assistance and provide the location or classroom number.

The handheld computing device 40 can take many forms, including a personal digital assistant (PDA). The handheld computing device 40 must have a screen or other means to display the attendance data, and an input device, such as a keyboard, or stylus and touch pad, for use by the teacher in correcting the automated attendance data. Indeed, the handheld computing device 40 could even be the standard classroom desktop, and for purposes of this patent "handheld computing device" includes any computing device that is in the classroom and that can be used to correct the provisional attendance report. In one embodiment, the handheld computing device 40 will take the form of a PDA with the following technical specifications: 802.11g enabled, 3.5 inch color screen, 64 MB Ram, SD slot, with a 400 MHz Intel X scale processor, running Microsoft® Windows CE.NET, version 4.1.

The handheld computing device 40 has means for sending and receiving data from the server 30. In one embodiment, the handheld computing device 40 will use wireless technology, such as 802.11g wireless technology. The same wireless protocol can be used for communication between the scanners 20 and the servers 30. Using 802.11g technology, the range (under current technological conditions) is about 280 feet, and if this is not sufficient to reach the server 30, relays or wireless access points (WAPs) 32 can be used. See FIGS. 2, 8. The WAPs typically have communication antennae 34. See FIG. 8. Of course, other wireless standards that exist now or that will be developed in the future can be used, including: 802.11b, Bluetooth, etc. Also, a wired connection can be used for communication between the scanners 20, server 30, and handheld computing device 40, although it may be less desirable than a wireless connection.

The handheld computing device 40 will also have a RFID tag, so that it can be tracked by the scanners 20 and the server 30.

Software

The present invention also includes novel software 50 to receive, manage, and export the automated attendance data that is gathered by the scanners 20. See FIG. 6. This software 50 compares and matches the attendance data acquired from the scanners 20 to classroom records and files. The software 50 then prepares a provisional attendance report for each classroom, and sends the report to the appropriate handheld computing devices 40, as described above. The software 50 also updates the attendance records in response to the corrections made by the teacher, and in response to each student who enters or leaves the classroom during the class period. The software 50 may be implemented using Visual Basic, Access, ODBC, or other suitable applications or development tools. The software 50 interacts with the server's operating system, which in one embodiment is Windows® 2000 Professional.

The software 50 has a student information system, and in one embodiment, the student information system is compatible with or created using Microsoft Access®. The student information system contains a long list of student identification and descriptive data. This server 30 and its software 50 can interface with the major commercially available Student Information Systems such as SASI®, Aeries®, and certain online based student information system such as Power School®. This ability to interface allows the user school to easily load its student identification information, class schedules, teacher assignments, room numbers, and student attendance codes. The software allows uploading of this information from the major software information systems used in U.S. schools today: SASI®, Aeries®, and Power School®. This allows the school administration to upload all of the required student information data fields in a relatively straightforward and rapid manner. These systems often include such identifying characteristics as student name, social security number, address, etc. The information system also contains class schedule, classroom location, teacher, class time duration, tardiness policies and related information for the entire school. Using this information and the raw attendance data provided by the scanners, the system can provide comprehensive attendance monitoring and reporting.

The software 50 also generates a variety of reports, including an attendance report for all classrooms during a period, for an individual student for the entire school day, etc. The software can generate ADA reports for any unit of time consistent with the applicable administrative reporting requirements, such as by the year, month, week, day, or class period.

In addition to generating reports that schools use internally, the software 50 helps school administrators to efficiently meet their information-reporting obligations to various governmental agencies. School administrators are required to provide a great deal of information, including ADA and other attendance data, to the school district. In turn, the districts are required to provide aggregate attendance information to the state and federal governments, documenting overall student attendance and specific program attendance. The states provide additional aggregate attendance data to the federal government, for funding purposes and to satisfy program compliance regulations. The software 50 of the present system is designed to provide attendance information in a variety of formats, so that reports from the present system will be compatible with the various reporting formats required by school districts and state and federal governments. This is accomplished by an exhaustive search of the data elements that ultimately comprise the various formulae for documenting such important parameters as daily student attendance. In other words, the software 50 manipulates the data from the student information system and from the attendance reports so that it is formatted in the manner required by various districts and reporting agencies.

Figure 6A:
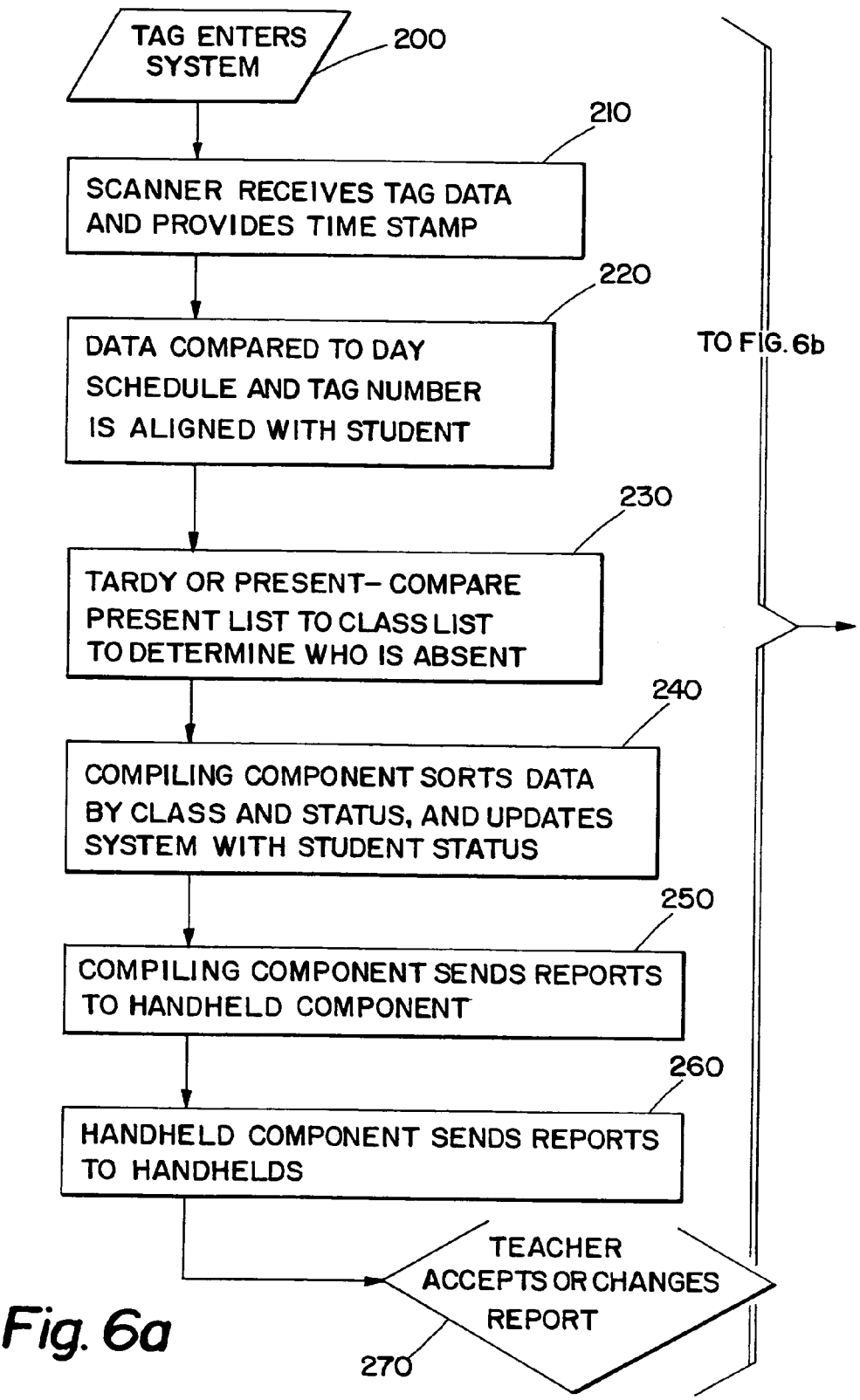
FIG. 6 is a flowchart showing the operation of the attendance monitoring software according to an embodiment of the present invention.
Figure 6B:
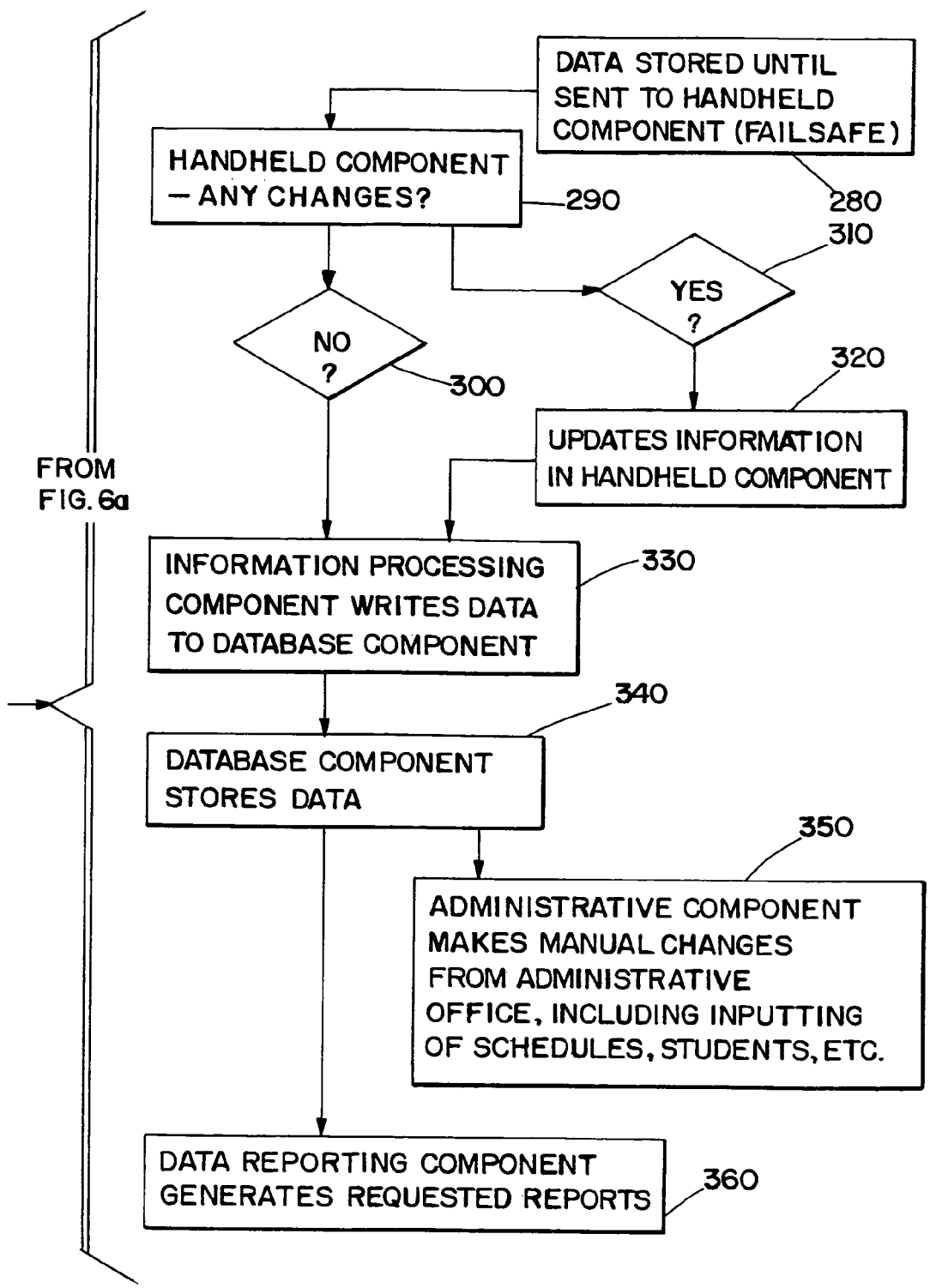

FIGS. 6a and 6b are an exemplary flowchart for the software 50. At 200, the tag 10 enters the system, and a time stamp is entered showing the time of entry at 210. At 220, the scanned data is then compared to the class schedule, and then the system determines if the student is present, tardy, or absent at 230. At step 240, the compiling component of the software 50 sorts the data by class, and updates the system with the students' status. Then at 250 the compiling component sends reports to the handheld component, and at 260 the handheld component sends reports to the handheld computing devices 40. At 270, the teacher then accepts or changes the report, and at 280 the data is stored until sent to the handheld devices 40. The teacher or other use decides whether to makes changes 290, and if there are no changes (300), then the information-processing component writes the changes to the database component at 330. If there are changes 310, the teacher makes them, and then the information is updated in the handheld component 320. At 340, the database component stores the data, at 350 the administrative component makes any necessary manual changes. Finally, at 360, any necessary reports are generated.

FIGS. 9a-9c shows how different states or districts can use the same student data elements to prepare reports in their own formats. The software 50 is programmed to report the required information in the format approved by the particular district or jurisdiction for which the report is being prepared.

Also, since the present system creates electronic attendance records, reports can be exported in electronic form to the school district or other agency, thereby saving time and resources over paper-based systems.

Other Embodiments

The description provided above focuses on the use of the present invention to monitor, record, and manage attendance data for a classroom. However, the present invention can be used in a number of other settings. For instance, the present system can be used to monitor ingress and egress from other areas of a school campus besides the classroom. Scanners 20 can be placed in school offices, the cafeteria, restrooms, etc. These additional scanners 20 will improve school security and discipline, since they provide administrators with knowledge of students' whereabouts even when they are not in the classroom. Without campus-wide scanners, it can be very difficult to locate a student, especially if the school is large.

Additionally, the present invention can be used in office buildings, factories, prisons, hospitals, or any other facility where it is important to know the location of individuals, or the time when they entered or exited a particular area.

One skilled in the art will appreciate that the present invention can be practiced by other than the preferred embodiments, which are presented for purposes of illustration and not of limitation.

We claim:

1. A method for gathering and validating attendance data, including the steps in the order of:
    providing a plurality of uniquely encoded tags, the tags adapted to be borne by an attendee;
    scanning the plurality of tags as the attendees pass into an attendance area without manipulation of the scanner or the tag;
    creating a provisional attendance report at least partially from information acquired by the scanner from the tags;
    said creating step including the step of comparing a class list of who is expected to be in attendance with a present list of which tags of the attendees are scanned in the attendance area by said scanning step to determine who on the class list is absent;
    communicating the provisional attendance report to an attendance tracker individual in the attendance area;
    personally visually inspecting the attendance within the attendance area by the attendance tracker regardless of whether any expected attendees are absent in the provisional attendance report;
    identifying differences between the provisional attendance report and results of said inspecting step; and
    modifying the provisional attendance report to correct the differences of said identifying step to establish a second attendance report, the second attendance report being more accurate than the provisional attendance report.

2. The method of claim 1 wherein said providing step includes the step of incorporating a circuit within the tags, the circuit adapted to be scanned to transmit information encoded on the tags to a processor, the processor adapted to create the provisional attendance report of said creating step.

3. The method of claim 1 wherein said scanning step includes scanning the plurality of tags at a rate of more than one tag per second.

4. The method of claim 1 wherein said scanning step includes the step of scanning the plurality of tags at multiple different distances away from a scanner performing said scanning step.

5. The method of claim 1 wherein said scanning step includes scanning the plurality of tags at multiple different orientations relative to a scanner providing said scanning step.

6. The method of claim 1 wherein said communicating step includes wirelessly transmitting a signal encoded with the provisional attendance report to a hand-held computing device located within the attendance area.

7. The method of claim 1 including the further step of continuing to scan during an attendance period and designating as tardy attendees whose tags are scanned for a first time after a beginning of the attendance period.

8. The method of claim 1 including the further step of continuing to scan during an attendance period and designating as leaving early attendees whose tags are scanned for a second time after a beginning of the attendance period and before an end of the attendance period, and associating a time of leaving early with the attendee who is leaving early.

9. The method of claim 1 including the further step of continuing to scan for tags and identifying a time between when each tag is first scanned and each tag is second scanned, and calculating an attendance time that the attendee associated with the tag was present within the attendance area.

* * * * *